(12) United States Patent
Mandachi

(10) Patent No.: US 10,345,757 B2
(45) Date of Patent: Jul. 9, 2019

(54) IMAGE FORMING APPARATUS

(71) Applicant: CANON KABUSHIKI KAISHA, Tokyo (JP)

(72) Inventor: Yojiro Mandachi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/836,203

(22) Filed: Dec. 8, 2017

(65) Prior Publication Data

US 2018/0164728 A1    Jun. 14, 2018

(30) Foreign Application Priority Data

Dec. 12, 2016 (JP) ................................ 2016-240252

(51) Int. Cl.
| | |
|---|---|
| *G03G 21/20* | (2006.01) |
| *B41J 29/377* | (2006.01) |
| *G03G 15/00* | (2006.01) |
| *G03G 15/08* | (2006.01) |
| *H04N 1/00* | (2006.01) |

(52) U.S. Cl.
CPC .......... *G03G 21/203* (2013.01); *B41J 29/377* (2013.01); *G03G 15/0887* (2013.01); *G03G 15/55* (2013.01); *G03G 21/206* (2013.01); *H04N 1/00* (2013.01); *G03G 15/502* (2013.01); *G03G 15/5083* (2013.01); *G03G 2215/00025* (2013.01); *G03G 2215/00953* (2013.01)

(58) Field of Classification Search
CPC .... G03G 21/20; G03G 21/203; G03G 21/206; G03G 15/55; G03G 15/0887; B41J 29/377; H04N 1/00
See application file for complete search history.

(56) References Cited

U.S. PATENT DOCUMENTS

| | | | | |
|---|---|---|---|---|
| 5,438,393 | A * | 8/1995 | Komatsu | .................. G01N 3/38 118/689 |
| 2014/0105621 | A1 | 4/2014 | Imanaka | |
| 2018/0027140 | A1* | 1/2018 | Ikeda | .................. H04N 1/00925 |
| 2018/0037022 | A1* | 2/2018 | Sasaki | .................. B41J 2/04508 |

* cited by examiner

*Primary Examiner* — Carla J Therrien

(74) *Attorney, Agent, or Firm* — Canon U.S.A., Inc. IP Division

(57) ABSTRACT

An image forming apparatus includes an image forming unit, an execution unit that executes dew condensation elimination operation for eliminating dew condensation in the image forming unit, a setting unit that sets a dew condensation prevention mode for executing the dew condensation elimination operation to an enabled state, a display unit, and a control unit that causes the display unit to display a warning screen and selects a type of image forming job to be restricted during execution of the dew condensation elimination operation in a case where the dew condensation prevention mode is set to an enabled state, wherein, in a case where an image forming job is received during execution of the dew condensation elimination operation, the control unit determines whether the received image forming job is executable based on the type of job selected.

7 Claims, 9 Drawing Sheets

IMAGE FORMING APPARATUS

BACKGROUND

Field

The present disclosure relates to an image forming apparatus employing an electro-photographic method.

Description of the Related Art

Dew condensation can occur in an image forming apparatus such as a copying machine or a printer due to change in temperature or humidity. The occurrence of dew condensation can negatively affect image formation. For example, chipped image or a scanning error caused by dew condensation on a laser scanner, and blurred image or noise from a cleaning blade caused by dew condensation on a photosensitive drum can occur in the electrophotographic image forming apparatus.

As a method of reducing the effect of dew condensation, suppressing the occurrence of dew condensation using an environmental heater, such as a drum heater, can be considered. However, in a case of a small-size image forming apparatus, using the environmental heater can be difficult in terms of cost because cost reduction has been advancing in recent years.

United States Patent Application Publication No. 2014/0105621 discusses an image forming apparatus including a unit for detecting the occurrence of dew condensation and a unit for eliminating the dew condensation. The image forming apparatus described in United States Patent Application Publication No. 2014/0105621 determines that dew condensation has occurred inside the image forming apparatus if an amount of rise in internal temperature of the image forming apparatus after driving a fan is a greater than or equal to a threshold value, and executes dew condensation elimination operation for eliminating dew condensation by heating a fixing heater or driving a fan.

In United States Patent Application Publication No. 2014/0105621, image forming operation is restricted during execution of dew condensation elimination operation, and this is beneficial for a user who places priority on quality of a printed material. Since the user has to wait until the image forming apparatus is reliably recovered from dew condensation, the dew condensation recovery operation can be problematic for a user who places priority on output speed rather than quality of a printed material.

SUMMARY

According to an aspect of the present disclosure, an image forming apparatus includes an image forming unit, an execution unit configured to execute dew condensation elimination operation for eliminating dew condensation occurring in the image forming unit, a setting unit configured to set a dew condensation prevention mode for executing the dew condensation elimination operation to an enabled state, a display unit, and a control unit configured to cause the display unit to display a warning screen and select, based on a user instruction, a type of image forming job to be restricted during execution of the dew condensation elimination operation in a case where the dew condensation prevention mode is set to an enabled state, wherein, in a case where an image forming job is received during execution of the dew condensation elimination operation, the control unit determines whether the received image forming job is executable based on the selected type of image forming job.

Further features will become apparent from the following description of exemplary embodiments with reference to the attached drawings.

DESCRIPTION OF THE EMBODIMENTS

Hereinafter, an exemplary embodiment will be described with reference to the appended drawings. The embodiment described hereinafter is not intended to be limiting, and not all of the combinations of features described in the exemplary embodiment are required.

Figure 1:
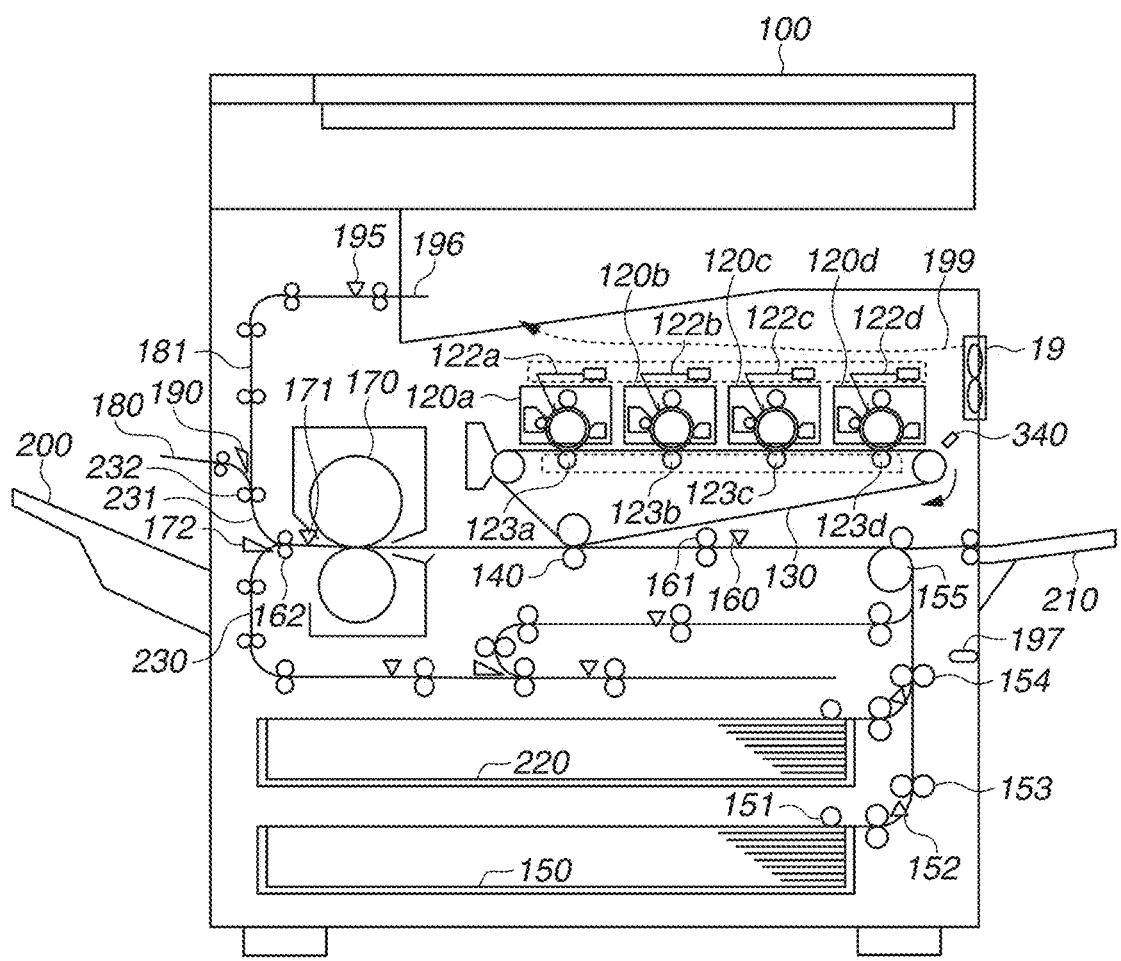
FIG. 1 is a cross-sectional view illustrating an image forming apparatus.

FIG. 1 is a cross-sectional view illustrating a basic configuration of an image forming apparatus of the present exemplary embodiment. An image forming apparatus 1 feeds and conveys a sheet, forms an image on the sheet, and discharges the sheet on which the image is formed. The image forming apparatus 1 includes a first sheet feeding cassette 150, a second sheet feeding cassette 220, and a manual sheet feeding tray 210 serving as sheet feeding ports. The image forming apparatus 1 also includes a pickup roller 151 and a sheet conveyance roller 155 for feeding and conveying sheets from each of the above sheet feeding ports. The image forming apparatus 1 includes a sheet pickup sensor 152 and a pre-registration conveyance sensor 160 for detecting the behavior of a fed sheet or a conveyed sheet.

The image forming apparatus 1 includes laser scanners 122a to 122d for forming images, a transfer unit 140 for transferring the images on a sheet, and a fixing unit 170 for fixing the images on the sheet. The laser scanners 122a, 122b, 122c, and 122d form images in respective colors of yellow, magenta, cyan, and black. The image forming apparatus 1 includes a first sheet discharge tray 196 and a second sheet discharge tray 200 serving as discharge ports of sheets. The image forming apparatus 1 includes a document reading unit 15 for reading a document and converting the read document into image data. The image forming apparatus 1 includes, as an auxiliary function, an operation unit 13 that receives an image forming instruction from the user and displays information to the user.

Hereinafter, alphabetical characters are omitted from the reference numerals, and the laser scanners 122a to 122d will be described as "laser scanner 122" when a common configuration is described. The other constituent elements will be also described in the same manner.

Figure 2:
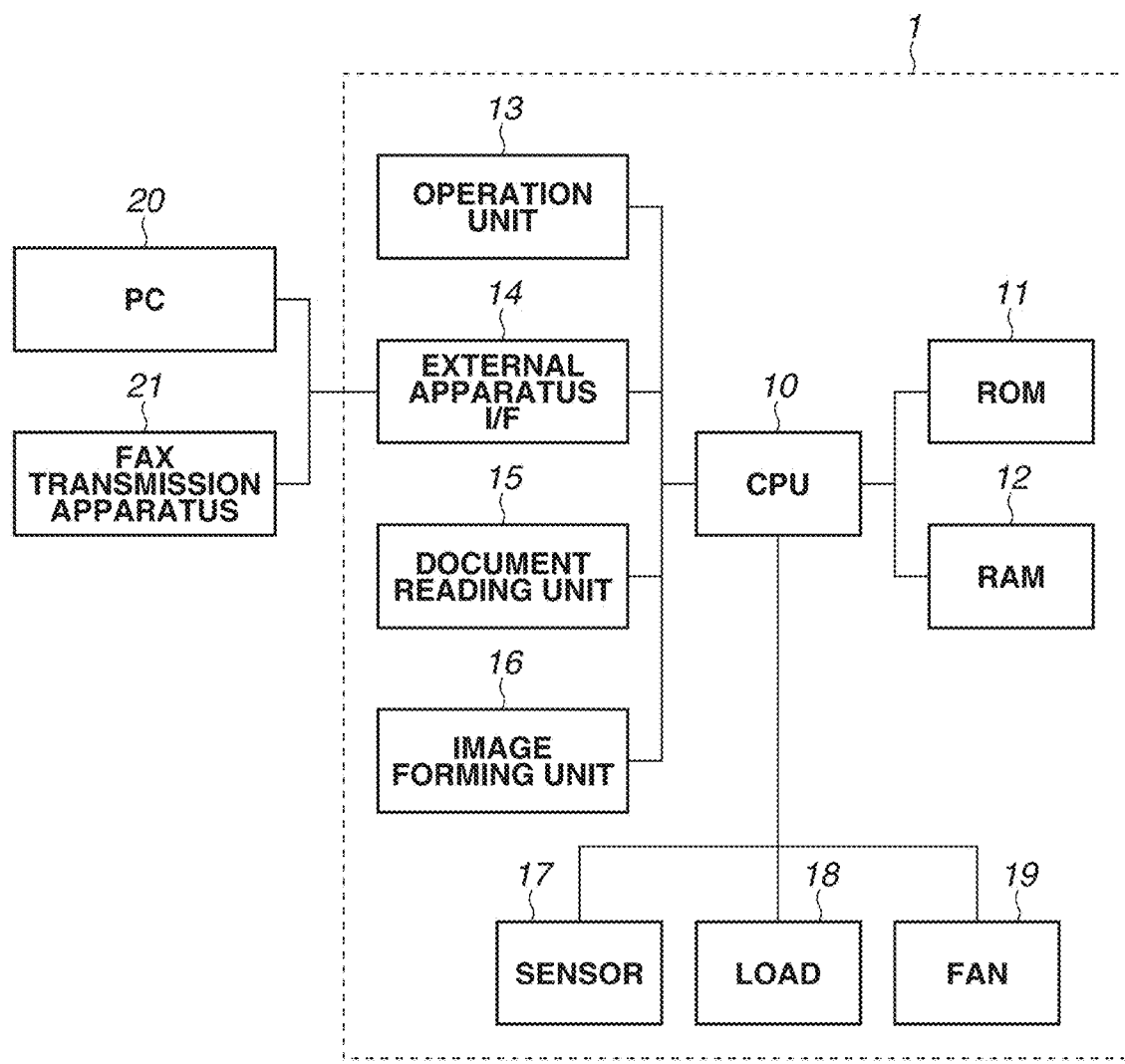
FIG. 2 is a control block diagram of the image forming apparatus.

FIG. 2 is a control block diagram illustrating a configuration of the image forming apparatus 1.

A central processing unit (CPU) 10 executes control of electric elements that constitute the image forming apparatus 1. A read only memory (ROM) 11 storing a program and a random access memory (RAM) 12 for storing control data are connected to the CPU 10. The CPU 10 reads the program stored in the ROM 11 and uses the RAM 12 as a work area to execute various kinds of processing based on the program.

The CPU 10 is connected to the operation unit 13 and an external apparatus interface (I/F) 14 for communicating with an external apparatus, such as a personal computer (PC) 20 and a facsimile transmission apparatus 21, so that various image forming jobs can be received thereby. In the present exemplary embodiment, the image forming apparatus 1 can receive a facsimile (hereinafter fax) job, a print job, and a copy job as image forming jobs. The fax job is a job for executing image forming operation based on facsimile data received from the facsimile transmission apparatus 21. The print job is a job for executing image forming operation based on print data described in a page-description language (PDL) received from the PC 20. The copy job is a job for executing image forming operation based on image data acquired from the document reading unit 15. When a start instruction of the above-described image forming job is input to the CPU 10 from the operation unit 13 or the external apparatus I/F 14, the CPU 10 executes image forming operation for forming an image on a sheet according to the start instruction. Specifically, the CPU 10 controls driving of a load 18, such as a motor, and detects a position of a fed sheet or a conveyed sheet through a plurality of sensors 17, such as the pre-registration conveyance sensor 160. The CPU 10 controls the image forming unit 16 including the laser scanner 122, the transfer unit 140, and the fixing unit 170. The CPU 10 also executes control of the document reading unit 15. Based on an instruction from the CPU 10, the document reading unit 15 reads a document, converts the read document into image data, and transmits the image data to the CPU 10. When below-described dew condensation elimination operation is executed, the CPU 10 drives a fan at full speed to execute the dew condensation elimination operation.

The fan 19 is an air blower for taking air from outside the image forming apparatus 1 into an internal portion of the image forming apparatus 1. Ambient air flows into the internal portion of the image forming apparatus 1 when the fan 19 is rotated. Along with the rotation of the fan 19, the ambient air flows in, passes through an air path 199, and blows off from a slit portion provided on the discharge tray. A rise in temperature of the cartridges 120a to 120d is suppressed by the air path 199 so that deformation of images caused by expansion of the photosensitive drum in the cartridge can be suppressed.

Figure 3:
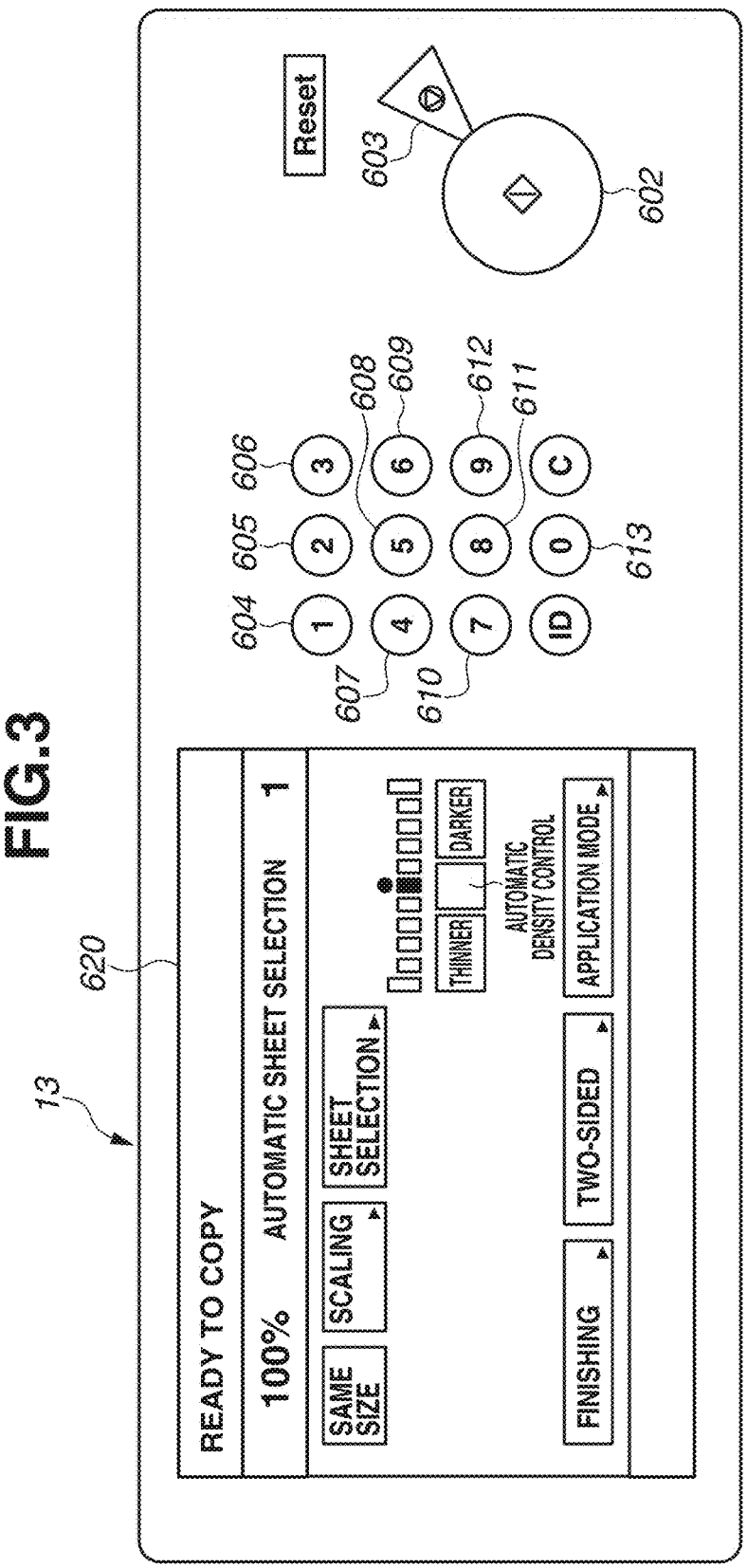
FIG. 3 is a diagram illustrating details of an operation unit.

FIG. 3 is a diagram illustrating details of the operation unit 13. The operation unit 13 includes a start key 602 for starting image forming operation and a stop key 603 for stopping the image forming operation. The operation unit 13 also includes numerical keys 604 to 613 for inputting numerals, which are used by the user to set the number of print copies. The operation unit 13 includes a touch panel 620 serving as a display unit that displays setting information and an error screen relating to image forming operation and enables the user to execute touch input.

Figure 4:
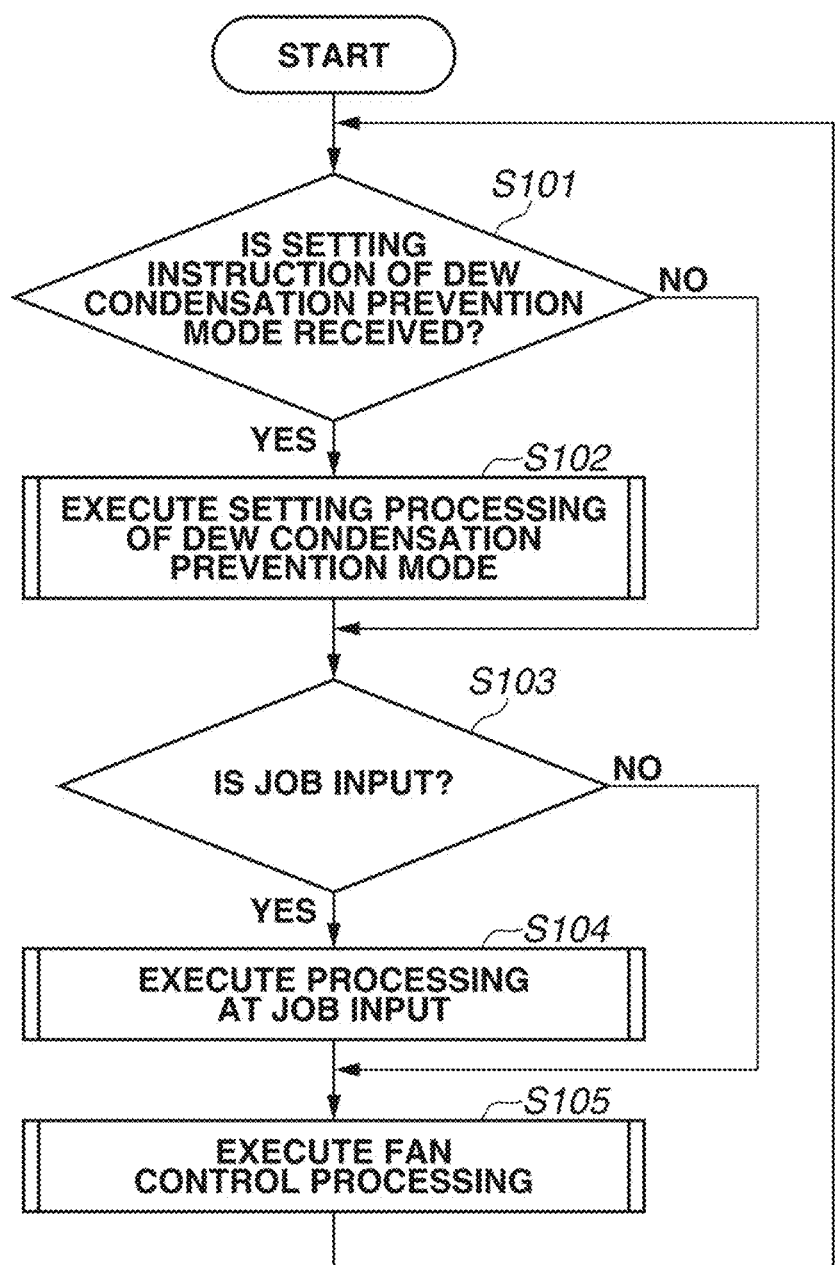
FIG. 4 is a flowchart illustrating main control processing.

FIG. 4 is a flowchart illustrating an example of processing executed by the CPU 10 of the present exemplary embodiment.

In step S101, the CPU 10 receives a setting instruction of a dew condensation prevention mode from the user via the operation unit 13. If the setting instruction of the dew condensation prevention mode is received (YES in step S101), the processing proceeds to step S102. In step S102, the CPU 10 executes setting processing of the dew condensation prevention mode in FIG. 5, and the processing proceeds to step S103. If the setting instruction is not received (NO in step S101), the processing in step S102 is not executed, and the processing proceeds to step S103.

In step S103, the CPU 10 determines whether an image forming job is received from the operation unit 13 or the external apparatus I/F 14. If the image forming job is received (YES in step S103), the processing proceeds to step S104. In step S104, the CPU 10 executes processing at job input illustrated in FIG. 7, and the processing proceeds to step S105. If the image forming job is not received (NO in step S103), the processing in step S104 is not executed, and the processing proceeds to step S105. In step S105, the CPU 10 executes fan control processing in FIG. 9, and the processing returns to step S101.

In the processing illustrated in FIG. 4, the CPU 10 monitors an input of a setting instruction of the dew condensation prevention mode and an input of an image forming job from the user, and executes processing according to the respective inputs.

Figure 5:
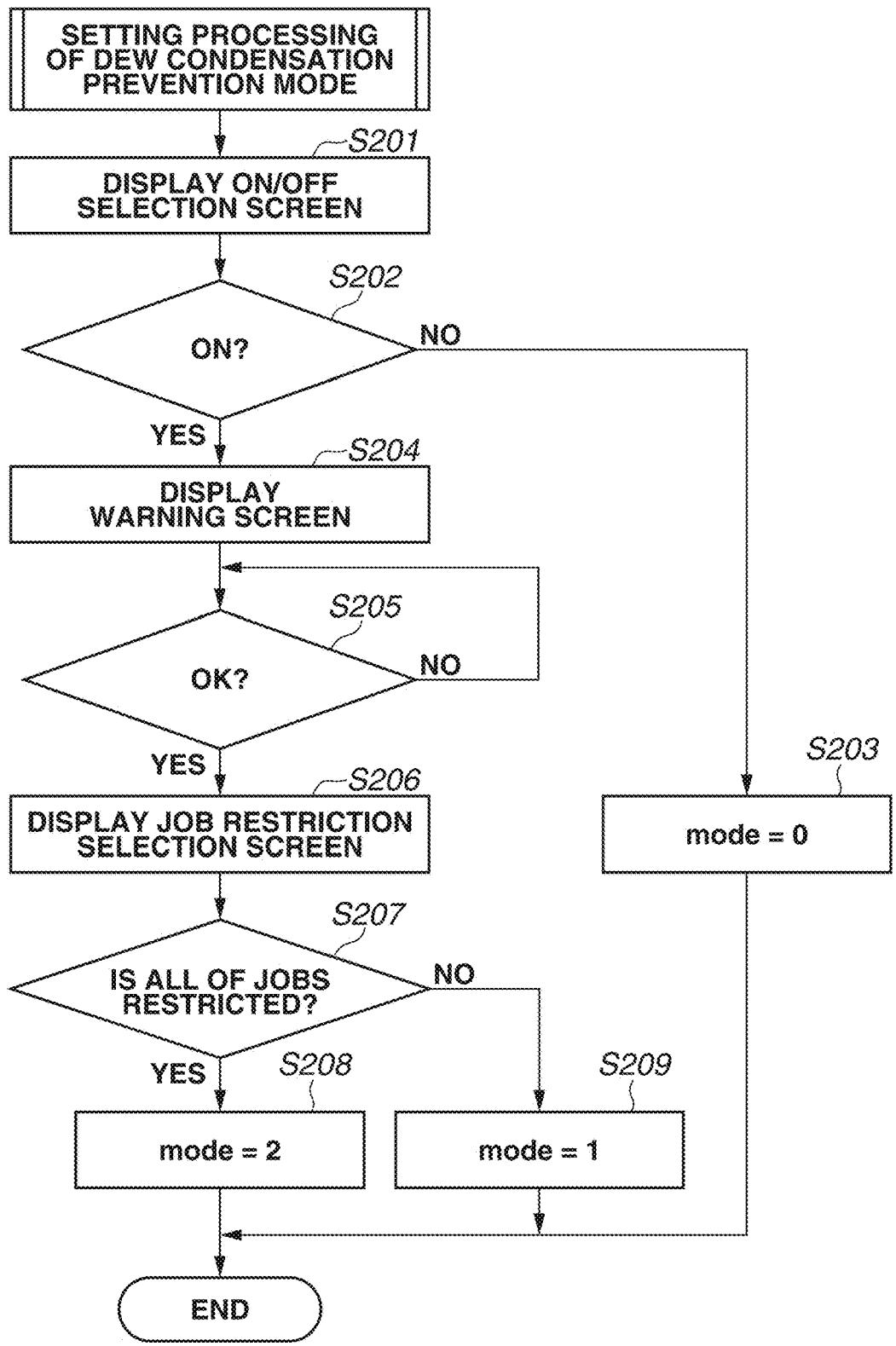
FIG. 5 is a flowchart illustrating details of processing executed in step S102 in FIG. 4.

FIG. 5 is a flowchart illustrating details of the processing executed in step S102 in FIG. 4. FIGS. 6A to 6E are diagrams illustrating transition of display screens displayed on the operation unit 13 at a time of setting the dew condensation prevention mode. Hereinafter, setting processing of the dew condensation prevention mode will be described with reference to FIGS. 5, 6A, 6B, 6C, and 6D.

Figure 6A:
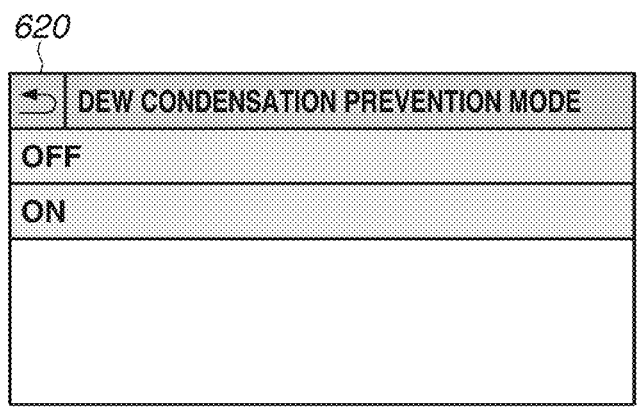
FIGS. 6A, 6B, 6C, and 6D are diagrams illustrating transition of display screens displayed on the operation unit at a time of setting a dew condensation prevention mode.
Figure 6B:
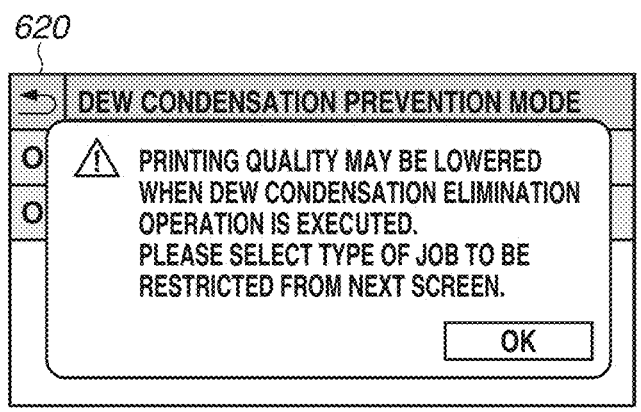

First, in step S201, the CPU 10 instructs the operation unit 13 to display an ON/OFF selection screen illustrated in FIG. 6A, and prompts a user to select whether to enable or disable the dew condensation prevention mode. In step S202, the CPU 10 determines whether the user has selected "ON" or "OFF" via the operation unit 13. If the user has selected "OFF" (NO in step S202), the processing proceeds to step S203. In step S203, the CPU 10 substitutes "0" for a variable "mode" stored in the RAM 12, and ends the processing in FIG. 5. The variable "mode" is a value to be referred in the processing at job input or the fan control processing described below, and a value thereof is initialized with "0".

If the user has selected "ON" in step S202 (YES in step S202), the processing proceeds to step S204. In step S204, the CPU 10 instructs the operation unit 13 to display a warning screen illustrated in FIG. 6B. The warning screen displays information indicating a possibility of a printing quality being lowered during execution of the dew condensation elimination operation. After displaying the warning screen, in step S205, the CPU 10 waits until the user inputs "OK" to the operation unit 13. If "OK" is input (YES in step S205), the processing proceeds to step S206. In step S206, the CPU 10 instructs the operation unit 13 to display a selection screen in FIG. 6C enabling the user to select a restriction range of the job. By displaying the selection screen, the CPU 10 prompts the user to select either a first mode or a second mode. In the first mode, a fax job is not printed but received in a memory, and another job, such as a print job or a copy job, received from the PC 20 is permitted. In the second mode, a fax job is not printed but received in a memory, and a job other than the fax job is prohibited. In a case where the first mode is selected, image forming operation of the fax job is restricted until the dew condensation elimination operation is completed, while image forming operation of a job other than the fax job is permitted during execution of the dew condensation elimination operation. In a case where the second mode is selected, image forming operation of both of the fax job and the job other than the fax job is restricted.

According to the present exemplary embodiment, a user can select a restriction range of image forming operation while notifying the user of possibility of the printing quality being lowered. The user can prevent a low-quality printed material from being output by selecting the second mode if the user wants to prevent lowering of quality. If the user wants to quickly output a printed material or a copy, the user can select the second mode in which the job other than the fax job is permitted so that the job other than the fax job can be output without waiting for reliable recovery of the image forming apparatus 1. As a result, useless waiting time can be reduced. Therefore, according to the present exemplary embodiment, various needs of the user can be handled resulting in improved usability. At the same time, because a fax job that is difficult to be re-printed is received in a memory with certainty, a risk of losing information can be reduced.

Figure 6C:
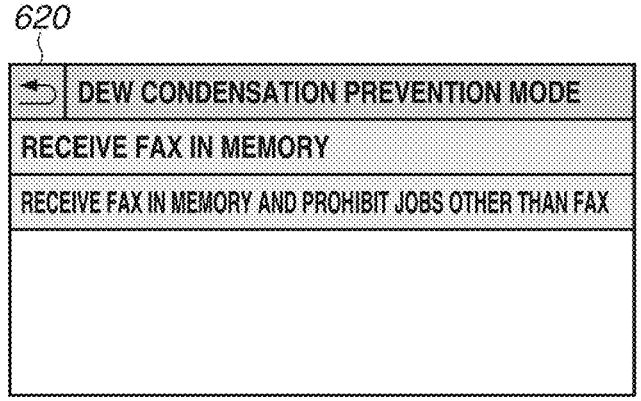
Figure 6D:
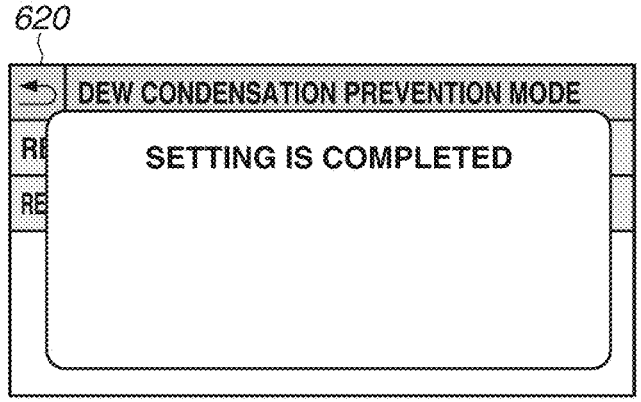

Next, in step S207, the CPU 10 checks the content of the instruction input through a screen in FIG. 6C and determines which mode has been selected from the first mode and the second mode described above. At the same time, the CPU 10 instructs the operation unit 13 to display a setting completion screen illustrated in FIG. 6D at the timing the user selects the mode. If the second mode is selected (YES in step S207), the processing proceeds to step S208. In step S208, the CPU 10 substitutes "2" for the variable "mode", and ends the processing in FIG. 5. If the first mode is selected (NO in step S207), the processing proceeds to step S209. In step S209, the CPU 10 substitutes "1" for the variable "mode", and ends the processing.

As described above, in a case where the user inputs a setting instruction of the dew condensation prevention mode, the CPU 10 enables the user to select a type of job to be restricted while notifying the user of the possibility of the printing quality being lowered during execution of dew condensation elimination operation. In the present exemplary embodiment, while the mode is selected from the two modes, the mode can be selected from a group of three or more modes. For example, a third mode in which all of the image forming jobs including the fax jab is prohibited can be provided.

Figure 7:
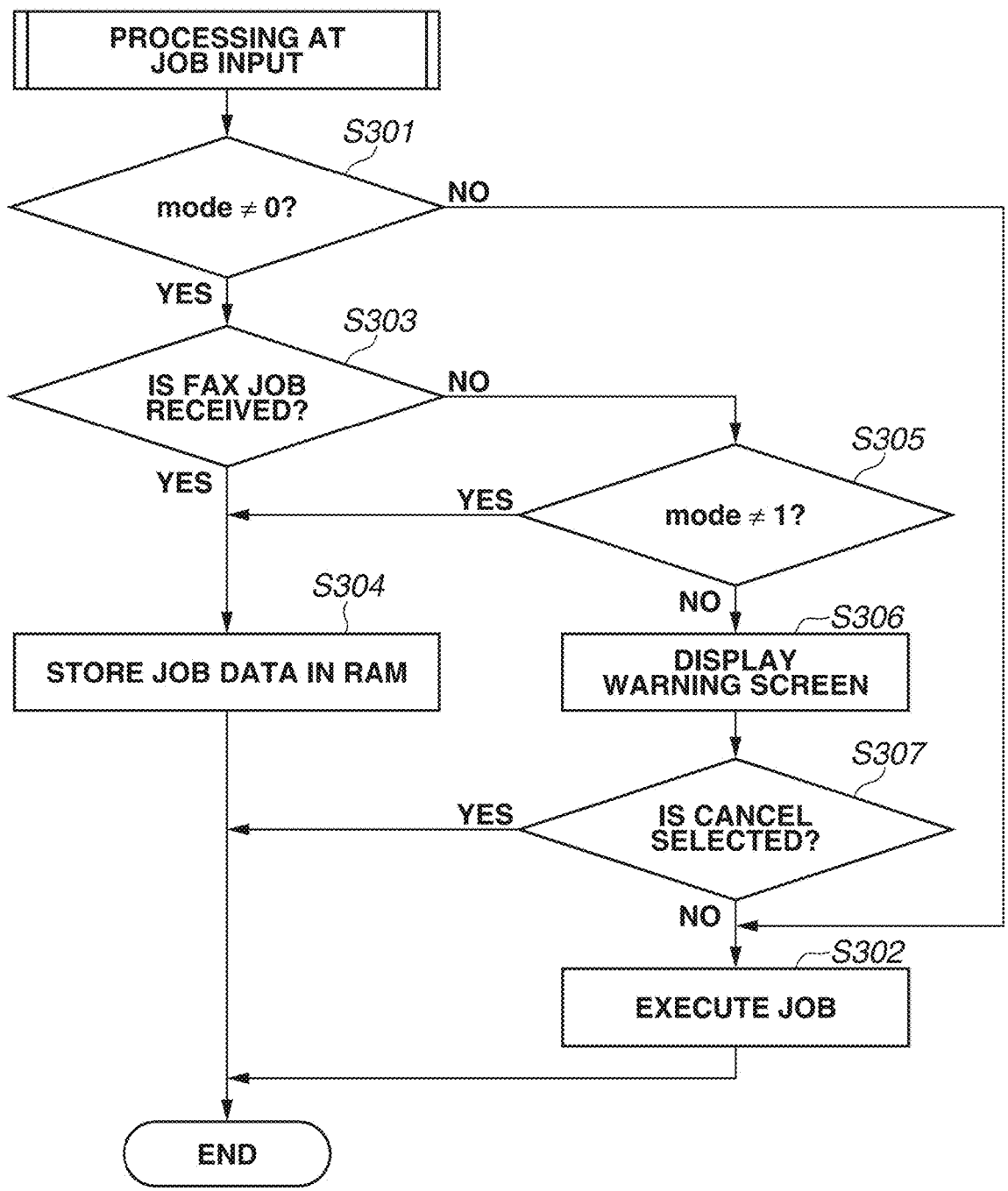
FIG. 7 is a flowchart illustrating details of processing executed in step S104 in FIG. 4.
Figure 8:
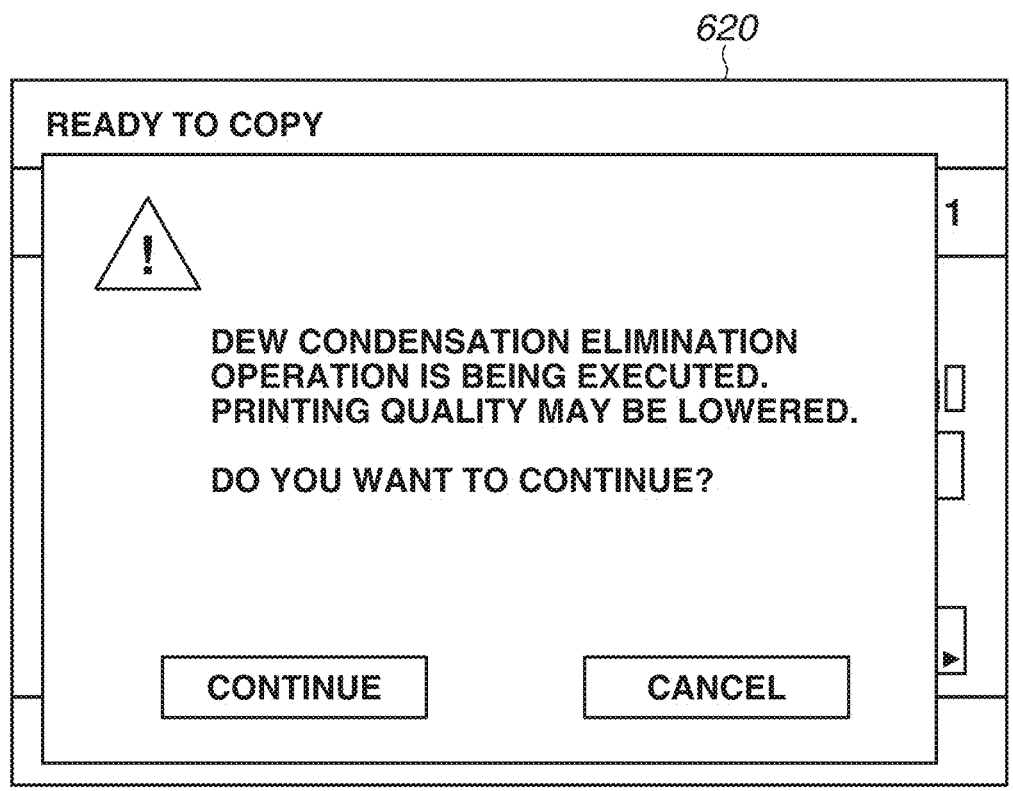
FIG. 8 is a diagram illustrating a screen displayed on the operation unit when an image forming job is input.

FIG. 7 is a flowchart illustrating details of processing in step S104 in FIG. 4. FIG. 8 is a diagram illustrating a display screen of the operation unit 13 when a job is input. Hereinafter, processing at job input will be described with reference to FIGS. 7 and 8.

First, in step S301, the CPU 10 refers to a value of the variable "mode" stored in the RAM 12. If the variable "mode" does not satisfy the condition "mode≠0" (NO in step S301), the CPU 10 determines that the dew condensation prevention mode is disabled, and the processing proceeds to step S302. In step S302, the CPU 10 controls the image forming unit 16 to execute the received image forming job. In other words, when the dew condensation prevention mode is set to a disabled state, image forming operation is executed regardless of the type of received image forming job.

In step S301, if the variable "mode" stored in the RAM 12 satisfies the condition "mode≠0" (YES in step S301), the processing proceeds to step S303 because the dew condensation prevention mode is set to an enabled state. In step S303, the CPU 10 determines a type of received image forming job. If the type of image forming job is a fax job (YES in step S303), the CPU 10 does not execute image forming operation at this point in time and switches the fax job to a job to be received in a memory because it is difficult to reprint the fax job. In other words, in step S304, the CPU 10 stores data of the received image forming job (i.e., facsimile data) in the RAM 12 and ends the processing in FIG. 7. As described above, in the present exemplary embodiment, when the dew condensation prevention mode is set to an enabled state, the CPU 10 executes processing of changing the received fax job to a job to be received in a memory.

In step S303, if a type of image forming job is a type other than the fax job (NO in step S303), the processing proceeds to step S305. In the present exemplary embodiment, a network print job received from the PC 20 or a copy job instructed from the operation unit 13 corresponds to the job other than the fax job. In step S305, the CPU 10 refers to a value of the variable "mode" again. If the variable "mode" satisfies a condition "mode≠1" (YES in step S305), the CPU 10 determines that the mode is the second mode in which the job other than the fax job is restricted, and the processing proceeds to step S304. In step S304, the CPU 10 stores image data of the received image forming job in the RAM 12 and ends the processing.

In step S305, if the variable "mode" does not satisfy the condition "mode≠1" (NO in step S305), the CPU 10 determines that the mode is the first mode in which a job other than the fax job is permitted, and the processing proceeds to step S306. In step S306, the CPU 10 instructs the operation unit 13 to display the warning screen illustrated in FIG. 8, and prompts the user to select whether to continue the job. In step S307, if "CONTINUE" is selected (NO in step S307), the processing proceeds to step S302. In step S302, the CPU 10 instructs the image forming unit 16 to execute the image forming job, and ends the processing in FIG. 7. If "CANCEL" is selected (YES in step S307), the CPU 10 deletes image data of the received image forming job and ends the processing in FIG. 7.

In the present exemplary embodiment, while the warning screen is displayed in step S306, there is a case where the user is not located in the vicinity of the image forming apparatus 1 if the job is received from the PC 20. In such a case, the processing can directly proceed to step S302, so that the CPU 10 executes image forming operation without executing the processing in step S307.

As described above, in the present exemplary embodiment, when the image forming job is received, the CPU determines whether the received image forming job is executable based on the type of received image forming job and the restriction range of the job selected by the user at a time of setting the dew condensation prevention mode. If the CPU 10 determines that the image forming job is executable, the CPU 10 promptly executes the image forming operation, and if the CPU 10 determines that the image forming job is not executable, the CPU 10 saves the image data in the RAM 12 and executes the image forming operation after the dew condensation elimination operation ends. In the present exemplary embodiment, while image data is saved in the RAM 12 if the CPU 10 determines that the image forming operation is not executable, the CPU 10 can cancel the received image forming job and leave a log as an error.

Figure 9:
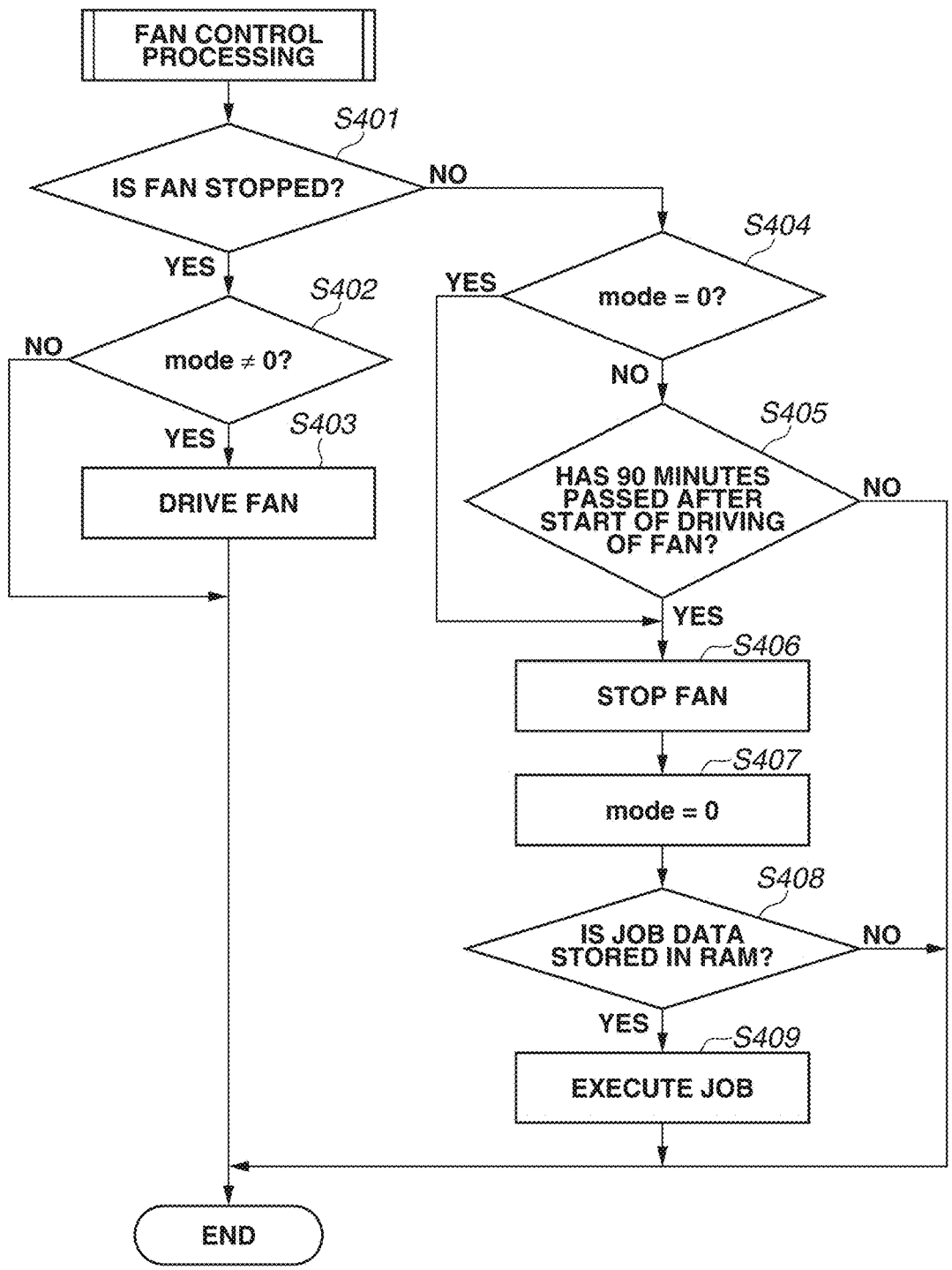
FIG. 9 is a flowchart illustrating details of processing executed in step S105 in FIG. 4.

FIG. 9 is a flowchart illustrating details of the processing in step S105 in FIG. 4. First, in step S401, the CPU 10 determines a driving state of the fan 19. If the fan 19 is stopped (YES in step S401), the processing proceeds to step S402. In step S402, the CPU 10 refers to a value of the variable "mode" stored in the RAM 12. If the variable "mode" satisfies the condition "mode≠0" (YES in step S402), the processing proceeds to step S403. In step S403, the CPU 10 drives the fan 19 and ends the processing. At this time, the CPU 10 drives the fan 19 at full speed. As a result of referring to the value of the variable "mode", if the variable "mode" does not satisfy the condition "mode≠0" (NO in step S402), the processing ends because the dew condensation prevention mode is set to a disabled state.

In step S401, if the fan 19 is being driven (NO in step S401), the processing proceeds to step S404. In step S404, the CPU 10 refers to a value of the variable "mode" stored in the RAM 12. If the variable "mode" does not satisfy the condition "mode=0" (NO in step S404), the CPU 10 determines that the dew condensation prevention mode is enabled, and the processing proceeds to step S405. In step S405, the CPU 10 refers to time elapsed after start of driving of the fan 19. If the time elapsed after start of driving is less than 90 minutes (NO in step S405), the processing ends. If 90 minutes has elapsed after start of driving (YES in step S405), the processing proceeds to step S406. In step S406, the CPU 10 stops driving the fan 19. In step S404, if the variable "mode" satisfies the condition "mode=0" (YES in step S404), the processing also proceeds to step S406. In step S407, the CPU 10 substitutes "0" for the variable "mode". In step S408, the CPU 10 determines whether image data is stored in the RAM 12. If the image data is stored (YES in step S408), the processing proceeds to step S409. In step S409, the CPU 10 instructs the image forming unit 16 to execute the image forming job and ends the processing in FIG. 9. If the image data is not stored (NO in step S408), the processing ends.

In the above-described flowchart in FIG. 9, while the image forming job is executed after 90 minutes has elapsed from the start of driving of the fan 19, the job does not have to be executed at that timing. For example, instead of executing the job after 90 minutes has elapsed from the start of driving of the fan 19, the job can be executed when the user provides an image forming instruction via the operation unit 13. For example, the CPU 10 can determine a job type of image data stored in the RAM 12, and automatically execute a job other than a fax job after 90 minutes has elapsed from the start of driving of the fan 19, and execute a fax job based on an instruction of the user.

As described above, after setting the dew condensation prevention mode, the fan 19 is driven for 90 minutes as the dew condensation elimination operation. A value "90 minutes" is merely an example. In a case where image data of the job has been saved in the memory during execution of the dew condensation elimination operation, image forming operation based on that image data is executed after the dew condensation elimination operation ends.

In the present exemplary embodiment, when the dew condensation prevention mode is set to an enabled state, the fan 19 is driven for 90 minutes as the dew condensation elimination operation. However, the exemplary embodiment is not limited to the above-described configuration. The CPU 10 can start monitoring presence or absence of dew condensation using a temperature and humidity sensor when the dew condensation prevention mode is set to an enabled state and execute the dew condensation elimination operation if the CPU 10 determines that the dew condensation has occurred in the image forming unit. Various methods can be considered as the method of determining the occurrence of dew condensation. For example, a sensor for detecting dew condensation can be arranged inside the image forming apparatus 1, and dew condensation can be determined based on detection information of the sensor. A temperature detection sensor for detecting the temperature outside the image forming apparatus 1 can be provided so that the occurrence of dew condensation is detected if a rise in temperature by a threshold value or more is detected within a certain time period.

Dew condensation elimination operation can be executed by heating a fixing heater or idling a photosensitive drum instead of driving the fan 19. Alternatively, dew condensation elimination operation can be executed by generating heat from the environmental heater.

According to the present exemplary embodiment, the user can select a restriction range of the image forming job while being notified of the possibility of the printing quality being lowered. The user can prevent a low-quality printed material from being output by setting a mode for prohibiting a job if the user wants to prevent lowering of quality. If the user wants to quickly output a printed material or a copy, the user can set a mode to permit a job other than the fax job so that the job other than the fax job can be output without waiting for reliable recovery of the image forming apparatus 1. As a result, useless waiting time can be reduced. Therefore, according to the present exemplary embodiment, various needs of the user are addressed and usability of the image forming apparatus 1 is improved. At the same time, because a fax job that is difficult to be re-printed is received in a memory with certainty, a risk of losing information can be reduced.

The functions of the above-described exemplary embodiments can be achieved by supplying a storage medium storing a program code of software to a system or an apparatus. In this case, a computer (or a CPU or a micro processing unit (MPU)) of the system or the apparatus reads out and executes the program code stored in the storage medium to realize the above-described functions. The storage medium that stores the program code can constitute the invention.

For example, a flexible disk, a hard disk, an optical disk, a magneto-optical disk, a compact disc read only memory (CD-ROM), a compact disc recordable (CD-R), a magnetic tape, a non-volatile memory card, or a ROM, can be used as the storage medium for supplying the program code.

The embodiment in which a computer reads and executes a program code to realize the functions of the above-described exemplary embodiment is not seen to be limiting. For example, an operating system (OS) operating on the computer can execute all or a part of actual processing based on the instruction of the program code to realize the functions of the above-described exemplary embodiment through the processing.

The functions of the above-described exemplary embodiment can be realized after a program code read out from the storage medium is written into a memory included in a function expansion board inserted into the computer or a memory provided in a function expansion unit connected to the computer. In other words, after the program code is written into the memory, a CPU included in a function expansion board or a function expansion unit can execute all or a part of the actual processing based on the instruction of the program code to realize the functions of the above-described exemplary embodiment through the processing.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-240252, filed Dec. 12, 2016, which is hereby incorporated by reference herein in its entirety.

What is claimed is:

1. An image forming apparatus comprising:
   an image forming device configured to form an image on a sheet in accordance with an image forming job;
   a fan configured to take air from outside the image forming apparatus;
   an operation unit; and
   a controller configured to:
   (i) in a case where an instruction for setting a dew condensation prevention mode is received by the operation unit, display a warning screen and drive the fan to remove dew condensation in the image forming device; and
   (iii) in a case where an image forming job is received after setting the dew condensation prevention mode, determine whether or not to execute the received image forming job on a basis of type of the received image forming job.

2. The image forming apparatus according to claim 1, wherein the warning screen displays information indicating a possibility of a quality of a printed material being lowered during the period in which the dew condensation prevention mode is set.

3. The image forming apparatus according to claim 1, wherein the control unit enables a user to select a type of image forming job to be restricted after displaying the warning screen.

4. The image forming apparatus according to claim 1, wherein the image forming job includes one or more of a facsimile job for executing an image forming operation based on facsimile data, a print job for executing an image forming operation based on print data, and a copy job for executing an image forming operation based on image data acquired from a document reading unit.

5. The image forming apparatus according to claim 1, wherein execution of a facsimile job received during the period in which the dew condensation prevention mode is set is prohibited while execution of an image forming job other than the facsimile job is permitted.

6. The image forming apparatus according to claim 1, wherein execution of all image forming jobs received during execution of the dew condensation elimination operation is prohibited.

7. The image forming apparatus according to claim 1, wherein a facsimile job received during execution of the dew condensation elimination operation is changed to a job to be received in a memory.

* * * * *